United States Patent

[11] 3,621,092

| [72] | Inventor | Peter H. Hofer<br>Berkeley Heights, N.J. |
|---|---|---|
| [21] | Appl. No. | 801,129 |
| [22] | Filed | Feb. 20, 1969 |
| [45] | Patented | Nov. 16, 1971 |
| [73] | Assignee | Union Carbide Corporation<br>New York, N.Y.<br>Continuation-in-part of application Ser. No. 714,205, Mar. 19, 1968. This application Feb. 20, 1969, Ser. No. 801,129 |

[54] STAMPING PROCESS
7 Claims, 7 Drawing Figs.

| [52] | U.S. Cl. | 264/322,<br>264/120, 264/324 |
|---|---|---|
| [51] | Int. Cl. | B29c 3/00 |
| [50] | Field of Search | 264/322,<br>324, 321, 120, 134, 136 |

[56] References Cited
UNITED STATES PATENTS

| 2,045,471 | 6/1936 | Kason | 264/322 X |
|---|---|---|---|
| 2,267,316 | 12/1941 | Thompson | 264/DIG. 55 |
| 2,356,826 | 8/1944 | Coss | 264/120 |
| 2,433,643 | 12/1947 | Beach | 264/322 |
| 3,113,788 | 12/1963 | Johnston | 264/DIG. 55 |
| 3,152,200 | 10/1964 | Kleist | 264/120 X |
| 3,312,224 | 4/1967 | Coates | 264/324 X |

FOREIGN PATENTS

| 127,224 | 4/1944 | Australia | 264/324 |

*Primary Examiner*—Robert F. White
*Assistant Examiner*—Richard R. Kucia
*Attorneys*—Paul A. Rose, Aldo J. Cozzi and James J. O'Connell ABSTRACT: A process for stamping a stampable glass fiber reinforced composite made from thermoplastic resin and a lofty glass fiber mat.

LOFTY GLASS FIBER MAT

NON-LOFTY BLANK—
GLASS FIBER UNDER COMPRESSION

LOFTY BLANK—
HEAT SOFTENED

COMPOSITE

BLANKS

INVENTOR.
PETER H. HOFER
BY James J. O'Connell
ATTORNEY

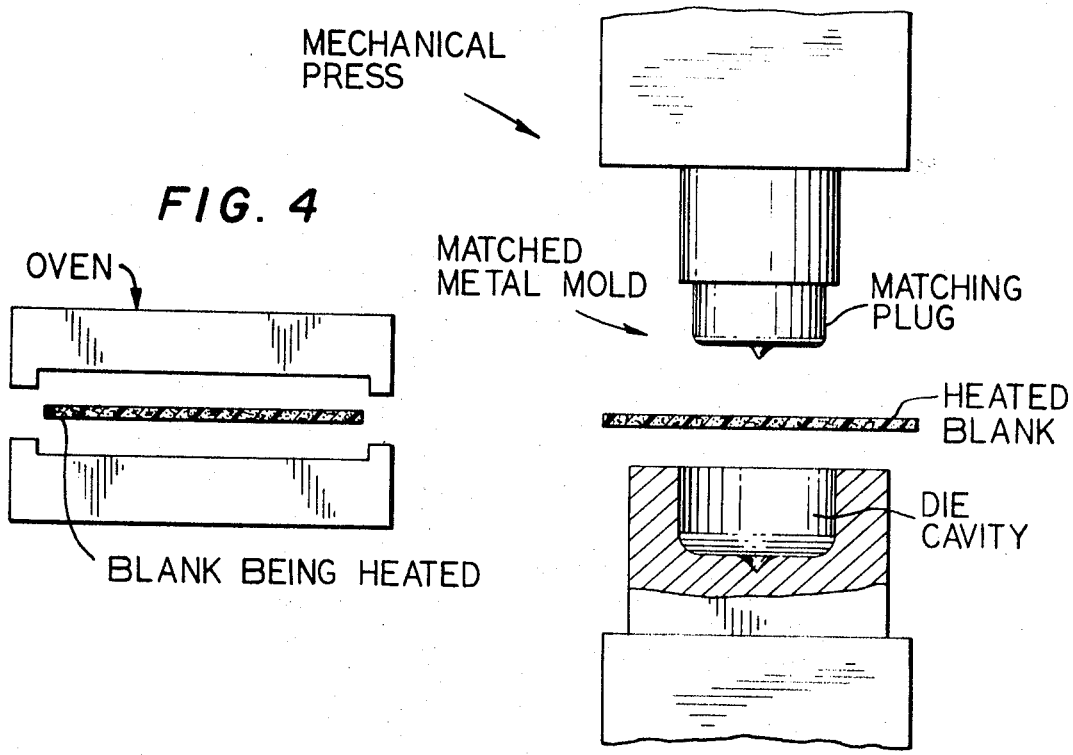
FIG. 4
FIG. 5
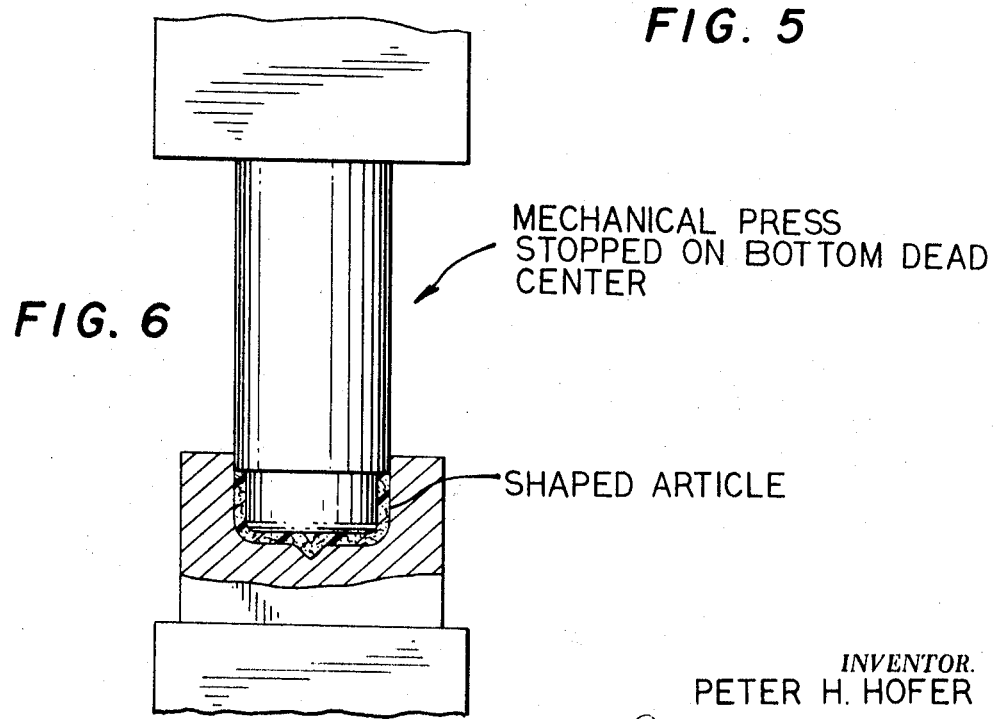
FIG. 6

STAMPING PROCESS

This application is a continuation-in-part of application Ser. No. 714,205 filed Mar. 19, 1968.

BACKGROUND OF THE INVENTION

1. Field of the Invention

The invention relates to the formation of shaped articles in a cold stamping process from heated composites made of thermoplastic resin and lofty glass fiber mats.

2. Description of the Prior Art

Recent technological developments relative to the preparation of molded or shaped articles from glass fiber/thermoplastic resin blanks have provided stamping procedures whereby such articles may be prepared in a process involving the use of a mechanical stamping press. In certain of these stamping processes a heated composite of glass fiber and thermoplastic resin is used as the blank from which the shaped article is stamped between matched dies in a press. Because of the speed with which these processes operate, it is necessary to provide, for use therein, blanks made from composites which have a unique combination of properties.

SUMMARY OF THE INVENTION

A composite made from a lofty glass mat and thermoplastic resin is stamped as a stampable blank in a rapid stamping process involving the use of a mechanical stamping press.

An object of the present invention is to provide a process in which molded or shaped articles may be readily stamped from blanks in a mechanical stamping press.

A further object of the present invention is to provide a process in which a blank made from glass fiber and thermoplastic resin which may be readily processed in a mechanical stamping press.

A still further object of the present invention is to provide a process which permits the escape of air from the die cavity of a press during the stamping of blanks in the press.

BRIEF DESCRIPTION OF THE DRAWINGS

FIGS. 4—6 show the processing of a blank of the present invention in a stamping process.

DESCRIPTION OF THE PREFERRED EMBODIMENT

Figure 1:
FIG. 1 is a side view of a lofty glass fiber mat.

It has been found that, in order to readily process a stampable blank made from glass fiber and thermoplastic resin in a mechanical stamping operation involving the use of a mechanical stamping process, the blank must be made from a composite which has been prepared from a lofty glass mat. The present invention, therefore, relates to a stamping process involving the use of a composite which comprises thermoplastic resin and glass fiber and wherein the glass fiber has been employed in the form of a lofty mat to which the thermoplastic resin has been charged, impregnated, or otherwise homogeneously admixed.

The term "loft" or "lofty" as it is used within the context of the present invention means, or relates to, a thickness/weight/area ratio of the glass fiber in the glass fiber mat. A lofty glass fiber mat, for the purposes of the present invention, will have a thickness of about 0.040 inches to one-half inch per ounce per square foot of mat.

The term "blank" as used within the context of the present invention means the stampable composite of resin and glass fiber which is actually inserted in the stamping press. In some cases the composite itself is used, as is, as the blank, and in other cases one or more blanks are cut from the composite.

The term "theremoplastic" as used within the context of the present invention means that the thereby described material, or composition, will soften or flow upon the application of heat thereto.

The composite is prepared by homogeneously distributing thermoplastic resin throughout the lofty glass mat while placing the composite under compression.

The composite will contain about 10 to 60, and preferably about 20 to 45, percent by weight of glass fiber and about 90 to 40, and preferably about 80 to 55 percent by weight of thermoplastic resin. The composite or blanks may be about 30 to 200 mils or more thick, and they will normally have the shape or configuration of a film or sheet, but such configurations are not essential to the present invention, and these blanks, therefore, may be prepared in any appropriate shape or configuration in order to suit the dies of the stamping press.

The composite is prepared by combining the thermoplastic resin and glass fiber using conventional laminating or impregnating techniques employed in the art, such as, compression molding, extrusion calendering, extrusion laminating, extrusion coating, dip coating, powder impregnation and knife coating.

The pressures which may be employed in these techniques vary with the procedure, for example the pressure employed in compression molding is about 25 to 3,000 and preferably 100 to 500, pounds per square inch (p.s.i.). For dip coating no pressure is required.

The temperatures employed during the procedures will depend on the softening and decomposition points of the thermoplastic resin. The laminating or impregnating must be conducted above the softening point and below the decomposition point of the resin. The process times will also vary depending on the resin being used and the respective amounts of glass fiber and resin that are employed. These processing times, therefore, may range from about 30 seconds to 30 minutes or longer depending on the components of the composites and the procedure being employed.

In forming the composite the thermoplastic resin is added to one to about 10 or more plies of the lofty glass fiber mat. A side view of a ply of such lofty glass fiber mat is shown in FIG. 1 of the drawings. The thermoplastic resin is usually used in form of a film or sheet having a thickness of about 0.002 to one-eighth inch.

Figure 2:
FIG. 2 is a side view of a cold blank of the present invention made from the lofty glass mat of FIG. 1.

In forming the composite it is essential to so combine and compress the lofty glass fiber mat with the thermoplastic resin that the thickness of the mat is substantially reduced and the composite is placed under compression in the resulting composite or blank, as shown in the side view of a cold blank in FIG. 2 of the drawings. This is accomplished, in part, by providing a composite which has a thickness which is thinner than the original thickness of the lofty glass mat. The composite of FIG. 2 was prepared from the mat of FIG. 1, but has less than one-half the thickness of the glass mat. For example, in the compression molding process used to prepare the composites, the impregnation of the glass fiber mat with the thermoplastic resin is accomplished by melting the thermoplastic resin under sufficient pressure and for such time as is needed to impregnate the glass fiber mat with good wetting of the glass by the resin, but without excessive flow or exudation of the resin from the body of the composite.

Figure 7:
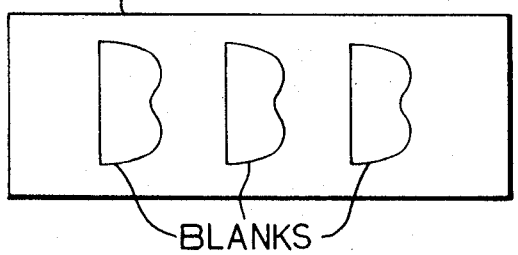
FIG. 7 shows a top view of a composite with blanks ready to be cut therefrom.

After being formed the composites are cooled and removed from the equipment in which they are prepared and stored for future use. In some cases the composite is used, as is, as the blank which is heat softened and then stamped in the press. In other cases one or more blanks having sizes and configurations more suitable to the application than those of the composite may be cut from the composite. The blank is preferably cut from a cold composite. FIG. 7 shows the top view of a series of three blanks that may be cut from one composite. These blanks could be used to stamp automobile fenders, roof panels and the like.

Figure 3:
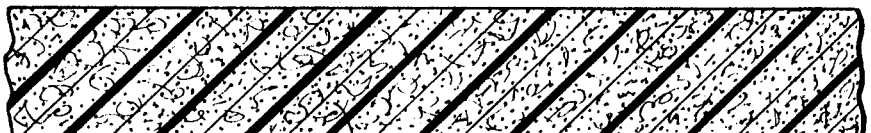
FIG. 3 is a side view of a hot, softened blank of the present invention.

During the process of preparing the composite, and of placing the fiber and resin under compression, the composite loses the loft that the lofty glass mat had, since the glass fiber mat is compressed during the formation of the composite. Prior to using the blank in a mechanical stamping press wherein the blank is stamped into the desired end product, the blank is heated in an oven to soften the resin therein so that the blank can be properly softened in order to be processed in the stamping press. During this heating operation the blank regains some of the loft originally exhibited by the lofty glass fiber mat, due to the softening of the resin in the oven. As the resin softens, the glass fibers which are under compression in the blank tend to relax and spring back to their original position, i.e., as they were in the lofty glass mat, as shown in the side view of a heated blank in FIG. 3 of the drawings. The blank of FIG. 3 was made by heating the blank of FIG. 2, whereupon the blank regained some of the loft exhibited by the mat of FIG. 1. As a result of this relaxation of the glass fibers, the heated blank swells about 20 to 500 percent of its original thickness. When the heated blank is stamped and cooled during the stamping operation, the resulting stamped article, loses all of the loft which the lofty glass mat originally had, and the glass fibers are once again placed under compression.

For some end use application, that is, for the preparation of certain types of stamped articles, it is preferable to use a blank which has been prepared from a lofty glass fiber mat which had a loft of about 40–100 mils, and swells 20–50 percent when heated. These applications would include articles having relatively steep sidewall configurations such as waste paper baskets, clothes hampers, garbage cans, drums and the like.

For other end use applications it is desirable to use a blank which has been prepared from a glass fiber mat which had a loft of about 60 to 500 mils, and swells 50–500 percent when heated. These end use applications would include automobile roof panels, automobile trunk lids, automobile hoods, trays and the like.

The properties which are necessary and desirable in a good stampable blank for use in the mechanical stamping processes, and which are provided by the blanks of the present invention, are the following:

a. the blanks, when hot, are swollen and porous and though such hot blanks contain more air than a hot blank prepared from a nonlofty glass fiber mat, these properties unexpectedly allow for a facile passage of air through the porous blank during the stamping operation and prevents entrapment of air between the blank and the dies of the press. As a result, stamped articles made from the blanks of the present invention are essentially devoid of entrapped air defects, such as diesel burning, blemishes and worm holes, in the surfaces of such articles. These defects occur frequently in stamped articles made from blanks prepared from nonlofty mats. Thus smoother and more uniform stampings are produced, with substantially fewer rejects for surface defects due to entrapped air, when the blanks of the present invention are used.

b. When hot, the blanks of the present invention are not sticky at temperatures sufficient for stamping above the softening point of the resin therein. Blanks which are not made with a lofty mat on the other hand, are very sticky at such temperatures. These elevated temperatures are encountered, of course, during the preheating of the blanks prior to the stamping operation. When the blank is sticky during these preheating operations it is very difficult to handle, and where sticky blanks are encountered it is necessary to use special handling procedures. The hot blanks of the present invention are not sticky at elevated temperatures because the glass fibers in the mat appear at the surface of the blank when they are released from compression.

c. The blanks of the present invention absorb substantially less heat within the blank during the heating of the blank prior to the stamping operation than does a blank made from a glass fiber mat which is not lofty. The blanks of the present invention also absorb substantially more heat on the outer surfaces thereof, than does a blank made from a glass fiber mat which is not lofty. This difference in heat absorption properties provides the blanks of the present invention with the advantage that the outer surface of the blank is hotter and allows the resin to flow more readily and thus achieve greater fidelity with respect to the configuration and surfaces of the dies in the stamping press without substantially increasing the cooling cycle. This difference in heat-absorbing power is due to the fact that a blank made from a lofty glass fiber mat has a substantially lower heat transfer coefficient than a blank made from a nonlofty glass mat. As a result, the blank made from the lofty glass fiber mat does not readily transfer BTU's from its outer surface to its inner parts.

d. The blanks of the present invention provide a stamped article which has an even distribution of glass fiber and resin throughout the matrix of the stamped and shaped article. A stamped article made from a blank, which in turn has been made from a glass fiber mat which was not lofty, on the other hand, would be resin rich at the surface or peripheral areas thereof, and particularly at corner areas thereof. These resin rich areas of the edges of the stamped articles are very prone to chipping and crazing, and extra care must be taken in handling such articles in order to avoid such chipping and crazing, and the resulting marring of the surface of such articles. The lack of such resin rich edge areas in the stamped articles made from the blanks of the present invention arises due to the fact that the glass fiber in the heat softened and swollen blank flows uniformly with the resin to all portions of the stamped article so that the stamped product has a uniform glass fiber/resin composition throughout. In a nonswollen blank made from a nonlofty glass fiber mat the resin separates from the compacted glass and flows independently of the glass to provide a nonhomogeneous composition in articles stamped from such blanks. The uniform distribution of glass fiber and resin that is obtained in stamped articles made from the blanks of the present invention provides stronger articles as evidenced by a greater stiffness in the stamped articles.

e. The blank of the present invention is substantially less flexible when hot than a blank made from a nonlofty glass fiber mat. This lack of flexibility has the advantage that it tends to prevent sag in the hot blank and thus permits greater ease in handling, particularly with automated equipment, during the transfer of the hot blank from the oven to the stamping press. This lack of flexibility in the hot blank is caused by the increased thickness of the hot blank which results from the swelling of the blank.

THE LOFTY GLASS MAT

As noted above, the glass fiber mat which is to be used in preparing the composites of the present invention is a mat of glass fiber which has a loft of about 40 to 500 mils thickness per ounce per square foot of mat. The mat must have a nonwoven construction.

The glass fiber used in making the lofty mat is preferably used in the form of glass fiber or strands which are about 1 inch to continuous in length, and are preferably ≥ 4 inches in length. The glass may be used in the form of filament, strand, thread, yarn, roving, nonwoven scrim, and the like.

The glass fibers may be treated or coated with one or more of the various types of sizing agents which are employed by those in the art. These sizing agents are usually multicomponent compositions which will comprise one or more lubricants, emulsifying agents, coupling agents, pH adjusters, film forming synthetic binders, antistatic agents and/or wetting agents. The preferred coupling agents are organosilicon compounds such as silyl peroxide compounds, alkoxy silanes, aminoalkoxy silanes, vinyl alkoxy silanes and aminoalkylalkoxy silanes.

Specific examples of the silyl peroxide compounds are vinyl tris(t-butylperoxy)silane, allyl tris(t-butylperoxy) silane, tetratris(t-butylperoxy)silane, allyl(t-butylperoxy) tetrasiloxane, vinyl methyl bis(t-butylperoxy)silane, vinyl tris($\alpha$, $\alpha$-dimethyl benzylperoxy)silane, allyl methyl bis(t-butylperoxy)silane, methyl tris(t-butylperoxy)silane, dimethyl bis(t-butylperoxy)silane, isocyanatopropyl tris(t-butylperoxy)silane and vinyl diacetoxy(t-butylperoxy)silane.

Examples of the aminoalkyl-alkoxy silanes would include gamma-aminopropyltriethoxy silane, gamma-aminopropyltriethoxy silane and bis(beta-hydroxy methyl) gamma-aminopropyltriethoxy silane.

Other organosilicon compounds which may be used include gamma-methacryloxypropyltrimethoxy silane, beta (3,4-epoxycyclohexyl)-ethyltrimethoxy silane, gamma-glycidoxy propyl trimethoxy silane, and vinyl triethoxy silane.

The individual glass fibers which are employed may be either straight or curved. The compaction which arises when the glass fiber mat is compressed with the resin during the formation of the blank is caused by the impregnation of the mat with the hot molten resin and by deaeration of the mat during such impregnation.

The lofty glass mats may be prepared by any of the commonly employed procedures for making glass mats such as the continuous strand or shopped strand processes, provided that the resulting mat has the desired loft properties which are required for use in the preparation of the composites of the present invention. The glass fiber mats are usually prepared from the sized glass fibers with the aid of a mat binder. The mat binder usually comprises film forming resin, emulsifying agent and coupling agent. The mat binder employed in making the lofty glass fiber mats from which the composites of the present invention are to be formed must be such as to allow the individual glass fibers in the composite to flow in relation to each other when the hot blank is being stamped in the stamping press. For this reason, the preferred film-forming resins which are to be used in the mat binders are thermoplastic resins, but some thermosetting resins may also be used.

THE THERMOPLASTIC RESINS

The polymeric materials which may be used in forming the composites which may be processed in accordance with the teachings of the present invention include all those compression moldable thermoplastic resin materials which have been proposed for use in the preparation of molded or shaped objects.

The polymeric materials which may be used in accordance with the teachings of the present invention include the vinyl resins. These vinyl resins may be either homopolymers organosilicon an individual vinyl monomer or they may be beta(of -epoxycyclohexyl)-ethyltrimethoxy or more vinyl monomer and from 0 to about 50 mol percent of one or more nonvinyl monomers which are interpolymerizable with vinyl monomers. The term "vinyl monomer" means a compound which contains at least one polymerizable group of the formula

Such vinyl monomers, therefore, would include the following: unsubstituted olefins, including monoolefins such as ethylene, propylene, 1-butene, and isobutylene and polyolefins such as butadiene, isoprene, dicylopetadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinyl-naphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrollidine, ethyl methylene malonate, acrolein, vinyl alcohol, vinyl acetal, vinyl butyral and the like. Nonvinyl monomers which may be interpolymerizable with vinyl monomers include carbon monoxide and formaldehyde.

The vinyl polymers would thus include, for example, polyethylene, polypropylene, ethylene-propylene copolymers, polyvinylchloride, polyvinylidene chloride, polyvinyl fluoride, polystyrene, styrene-butadiene-acrylonitrile terpolymers, ethylene-vinylacetate copolymers, ethylene-acrylic acid copolymers, ethylene-acrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene/acrylic acid copolymers, ethylene-ethyl methacrylate copolymers, ethylene-ethylacrylate copolymers, ethylene-vinyl acetate copolymers, ethylene-acrylic acid ethylacrylate terpolymers ethylene-acrylic acid-vinylacetate terpolymers, and the like.

Also included within the term "polymer" are the metallic salts of those polymers or blends thereof which contain free carboxylic acid groups. Illustrative of such polymers are ethylene-acrylic acid copolymers, ethylene-methacrylic acid polymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1,2, and 3 valent metals such as sodium, lithium, potassium, calcium, magnesium, aluminum, barium, zinc, zirconium, beryllium, iron, nickel, cobalt, and the like.

Where two or more monomers are used to form a polymer, the monomer moieties may be dispersed in a random or block fashion in the polymeric chain, or one or more chains of monomer moieties may be grafted to other chains of monomer moieties.

The polymers may be used in any of the forms in which they are commonly employed in the molding arts such as in the form of powder, pellets, granules, and the like, and blends of the same with one or more adjuvant materials. Such adjuvant materials would include materials such as plasticizers, heat and light stabilizers, fillers, pigments, processing aids, extenders, and impact improvers.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions for their intended usage under the described operating conditions. The adjuvants are used in amounts which will be effective for the intended purpose. Thus, for example, the effective amount of plasticizer is a "plasticizing amount" that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used when the filler would be used in such amounts as to provide the desired reinforcing effect.

THE STAMPING PROCESS

The following sequence of steps are employed in utilizing the stampable blanks in the stamping process of the present invention:

a. The blank is heated to a temperature which is above the melting point and below the decomposition point of the thermoplastic resin component of the blank.

b. The thus heated blank is transferred to a cold mold of a mechanical stamping press wherein the set of dies therein has the desired configuration of the intended shaped article.

c. The press is closed for a period of time sufficient to cause the blank to fill the die cavity in an essentially strain free condition and to cool the blank to retain the desired shape of the die cavity.

d. The press is opened and the molded article is ejected.

The blank is heated in step (a) as shown in FIG. 4 of the drawings, for a period of time sufficient to cause the resin to flow or become soft enough so that the desired part can be shaped in the stamping press. The blank will swell, when so heated, and increase in thickness about 50 to 500 percent of the thickness of the unheated blank. The residence time of the blank in the heatings means, such as an oven, will depend on a variety of factors, such as, the resin which is being employed therein, the size of the blank, the respective amounts of the glass fiber and the resin in the blank; heating capacity, temperature and wave length of the oven. These oven residence times, therefore, may range from about 4 seconds to about 5 minutes.

The blank which is transferred to, or inserted in, the stamping press may be oversized, undersized or the same size with respect to the die cavity of the press. A plurality of blanks may also be stamped or laminated together in one stamping operation.

The press in which the blank is to be stamped is considered a cold press in that the top and bottom dies of the press are maintained between room temperature to below the melting or softening temperature of the resin in the blank, and preferably at about 60 to 80° F. during the stamping operation by the use of a cooling medium such as water.

After the heated blank has been deposited in the cold press as shown in FIG. 5 of the drawings, the dies of the press are closed for a period of time sufficient to permit the blank to fill the die cavity in a strain free condition, and further to permit the charge to cool sufficiently to retain the desired shape of the dies as shown in FIG. 6 of the drawings. The residence time of the part in the die is of the order of about 3 to 60 seconds for blanks 0.030 to 0.400 inch thick. The speed and the force with which the molding operation is carried out in the press warrants the operation being called a stamping process rather than a molding process.

After the stamping operation the dies are opened and the resulting shaped article is readily removed from the dies. At this point the shaped article usually has a temperature of from about room temperature to a temperature which is substantially below the melting point of the polymeric component of the shaped article.

The shaped articles may be prepared in various shapes and forms having configurations with planar and/or nonplanar surfaces. The shaped articles have a thickness generally of about 0.020 to 0.200 inch. The cross section of the stamped articles can be uniform or nonuniform. For example, ribs, bosses, and other protuberances can be provided in the articles and thin cross-sectional areas can be positioned adjacent to relatively thick cross-sectional areas.

Holes and notches, if desired, can be formed in the shaped object during the stamping operation or in a subsequent piercing operation conducted on the cooled shaped object using conventional techniques.

The stamping process in which the blanks of the present invention are employed requires that the press be, in effect, dead stopped on substantially bottom dead center, i.e. no more than about 5° from dead center, for a short period of time as shown in FIG. 6 of the drawings. This dead stopping technique is directly contrary to the practices which must be followed in the metal stamping arts, wherein dead stopping at bottom during the stamping cycle could cause the punch die to stick on bottom. No such sticking occurs in the stamping process using the blanks of the present invention.

The press used in the stamping process must be a mechanical stamping press or its equivalent. A conventional hydraulic press cannot be used since it would not be able to provide the combination of rapid pressing speed and instant available pressure which is needed in the stamping process. A hydraulic press with an extra large energy storage system to duplicate the action of a mechanical press can be used. This stamping process requires that pressures of the order of about 300 to 2,000 pounds or more per square inch be repetitively delivered in stamping cycles of about 10 to 60 seconds, i.e., button to button. The rapid closing of the stamping press under these pressures prevents premature cooling of the charge during the mold fill time. Moreover, because the charge flows so quickly in the mold lower stresses and orientation are induced in the resulting shaped article than are induced in shaped articles prepared in injection molding operations.

Although the stamping process may be conducted with the type of mechanical presses which are employed in the metal stamping arts, the process of stamping the blanks of the present invention unexpectedly provides unusual advantages over those provided in the metal stamping arts in that the shaped articles made from such blanks can be provided with compound curve,, sharp corners and varying cross sections in stamping arts. Thus, fewer dies and processing steps are needed for preparing shaped articles having nonplanar configurations from the blanks of the present invention than would be needed if the same shaped articles were to be made from metal in a metal stamping process.

The following examples are merely illustrative of the present invention and are not intended as a limitation upon the scope thereof.

EXAMPLES

Composites containing 60 weight percent resin and 40 weight percent glass fiber are prepared as disclosed hereinafter. When formed the composites will have a thickness of 100 mils and measure 48 inches wide by 96 inches long. The thermoplastic resins employed in preparing the composites are the following:

| Resin | Composition & Properties of resin |
|---|---|
| A | homopolymer of propylene having a melt index or melt flow at 230° C. of 4 and a melting or softening point of 165° C. |
| B | homopolymer of styrene having a Rossi Peakes flow at 135° C. of 190—280 seconds and a melting or softening point of 100° C. |

C     a nylon-6 homopolymer having a melt index or melt flow at 230° C. of 16 and a melting or softening point of 219° C.

a polyvinylchloride homopolymer having an inherent viscosity of 0.76—0.80 and a melting or softening point of 70° C.

E     a 72/28 percent by weight copolymer of styrene and acrylonitrile having a melt index or melt flow at 200° C. of 1.5 and a melting or softening point of 100° C.

The resins are used in the form of film or sheets which are about 5 or 30 mils thick and the composites are prepared by compression molding 5 plies of the resin with 3 plies of lofty glass fiber mat for 10 minutes at a temperature which is about 50 to 100° C. above the softening or melting point of the resin. The plies of resin and fiber glass are interleaved in the order resin/glass fiber/resin/glass fiber/resin/resin/glass fiber/resin. The glass fiber mat weighs about 1½ ounces per square foot.

The compression molding conditions to be used, as well as the specific resin, and the characteristics (loft and fiber length) of the glass mat to be used in preparing the six composites, I to VI, are listed below in table I:

TABLE I

| Composite: | Compression molding conditions | | Resin to be used in the composite | Loft ratio in glass mat | Fiber length of the glass in the mat |
|---|---|---|---|---|---|
| | Temperature, ° C. | Pressure, p.s.i. | | | |
| I | 205 | 50 | A | 3/1 | Continuous. |
| II | 205 | 50 | A | 5/1 | 5 inches. |
| III | 220 | 75 | B | 3/1 | Continuous. |
| IV | 240 | 75 | C | 3/1 | Do. |
| V | 200 | 100 | D | 2/1 | 2 inches. |
| VI | 245 | 100 | E | 2/1 | Do. |

Prior to being stamped in the stamping press 4½ inches × 7½ inches blanks are cut from each of the composites and heated in an infrared oven. Table II below lists the heating conditions to be used for each blank, the composite source of the blank and the thickness of the heated blanks:

TABLE II

| Composite to be used: | Blank | Oven conditions | | Thickness of heated blank, inches. |
|---|---|---|---|---|
| | | Time, seconds | Temperature | |
| I | 1 | 40 | 210° C. | 0.350 |
| II | 2 | 40 | 210° C. | ¹ 0.450 |
| III | 3 | 30 | 245° C. | ¹ 0.300 |
| IV | 4 | 50 | ¹ 260° F. | ¹ 0.300 |
| V | 5 | 45 | ¹ 220° C. | ¹ 0.200 |
| VI | 6 | 50 | ¹ 260° F. | ¹ 0.250 |

¹ Approximate.

After the blanks are prepared and heated as described above, they are then stamped in a mechanical stamping press to provide plaques 5 inches × 8 inches × 0.084, inch using the indicated stamping conditions, as listed below in table III:

TABLE III

| Blank | stamping conditions | |
|---|---|---|
| | time, seconds in closed mold | pressure, p.s.i. (approximate) |
| 1. | 15 | 800 |
| 2. | 15 | 800 |
| 3. | 10 | 1300 |
| 4. | 15 | 1500 |
| 5. | 15 | 1400 |
| 6. | 10 | 1600 |

None of the hot blanks thus prepared are sticky and they are easy to handle. They do not sag during transfer from the oven to the press. The stamped plaques are devoid of surface blemishes due to entrapped air and they contain an even distribution of the resin and glass throughout. They have no resin rich edges. The plaques are useful as building panels.

The loft of the glass mat is reported, as noted above, as a thickness of 0.040 to 0.500 inch per ounce per square foot of glass mat. The measurement used to determine loft are taken on square foot samples of the mat and the samples are taken across the width of the mat. The samples are then weighed to provide the weight factor for the loft determination. The thickness of the mat is measured by a thickness gauge calibrated to 1/1000 of an inch. The thickness values are taken while allowing the gauge foot (12 inches × 12 inches × 1/8 inch steelplate-weight 5 pounds) to rest on the mat with no load applied as well as with a uniform load of one pound per square inch pressure. The loft is then calculated from the weight and thickness values. The loft may then be reported in inches of thickness per ounce of glass fiber per square foot of mat under either "no-load" conditions, or under load conditions of one pound per square inch. The loft values of 0.040 to 0.500 inch per ounce per square foot of mat which are the criteria of the mat used in the present invention are based on no-load conditions.

As noted in the examples above, the loft of the glass mat may also be reported as a ratio of the thickness of the mat under no-load conditions to the thickness of the mat under a load of one pound per square inch pressure. In the examples therefore, composites I, III and IV are prepared from 1½ ounce per square foot mats, each of which have a thickness of about 240 mils for the unloaded mat and a thickness of about 80 mils when the mat is loaded with a pressure of one pound per square inch. The glass mats have a loft ratio, therefore, of 3:1. One of such mats is used for each ply of the glass fiber in composites I, III and IV.

Composite II of the examples has a loft ratio of 5:1 since it is prepared from a 1½ ounce per square foot mat that has a thickness of about 400 mils, for the unloaded mat, and a thickness of about 80 mils when the mat is loaded with a pressure of 1 pound per square inch. One of such mats was used for each ply of glass fiber in composite II.

Composites V and VI of the examples have a loft ratio of 2:1 since they are prepared from 1½ ounce per square foot mats which have a thickness of about 220 mils for the unloaded mat, and a thickness of about 110 mils when the mat is loaded with a pressure of one pound per square inch One of such mats was used for each ply of glass fiber in composites V and VI.

For the purposes of the present invention it is preferable to use a mat having a loft ratio of about 2:1 to about 5:1.

The preferred compression moldable thermoplastic resins are those having a moldulus of at least 100,000 pounds per square inch.

What is claimed is:
1. A process comprising
    a. charging a heat swollen blank to the cold dies of a mechanical stamping press, said blank being a composite of compression moldable thermoplastic resin and lofty glass fiber mat wherein the glass is under compression prior to the heating of the blank and the blanks swells about 50 to 500 percent of the thickness of the unheated blank when heated, b. closing the dies for a period of time sufficient to permit the charge to fill the die cavity in an essentially strain free condition and to cool sufficiently to retain the shape of the dies, and c. opening the dies and recovering the thus shaped article.

2. A process as in claim 1 in which said blank comprises about 40 to 90 weight percent of thermoplastic resin and about 10 to 60 weight percent of glass fiber.

3. A process as in claim 2 in which said thermoplastic resin is polypropylene.

4. A process as in claim 2 in which said thermoplastic resin is polystyrene.

5. A process as in claim 2 in which said thermoplastic resin is a nylon resin.

6. A process as in claim 2 in which said thermoplastic resin is polyvinylchloride.

7. A process as in claim 2 in which said thermoplastic resin is a styrene-acrylonitrile copolymer.

* * * * *

PO-1050
(5/69)

UNITED STATES PATENT OFFICE
CERTIFICATE OF CORRECTION

Patent No. 3,621,092      Dated November 16, 1971

Inventor(s) Peter H. Hofer

It is certified that error appears in the above-identified patent and that said Letters Patent are hereby corrected as shown below:

Column 5, lines 52 thru 54 should read

--resins. These vinyl resins may be either homo-polymers of an individual vinyl monomer or they may be interpolymers of one or more vinyl--;

Column 5, line 67, "dicyclopetadiene" should read --dicyclopentadiene--.

Signed and sealed this 23rd day of May 1972.

(SEAL)
Attest:

EDWARD M. FLETCHER, JR.
Attesting Officer

ROBERT GOTTSCHALK
Commissioner of Patents